March 24, 1936. G. A. McEVOY 2,034,821
NONSKID DEVICE FOR WHEELS
Filed April 23, 1934
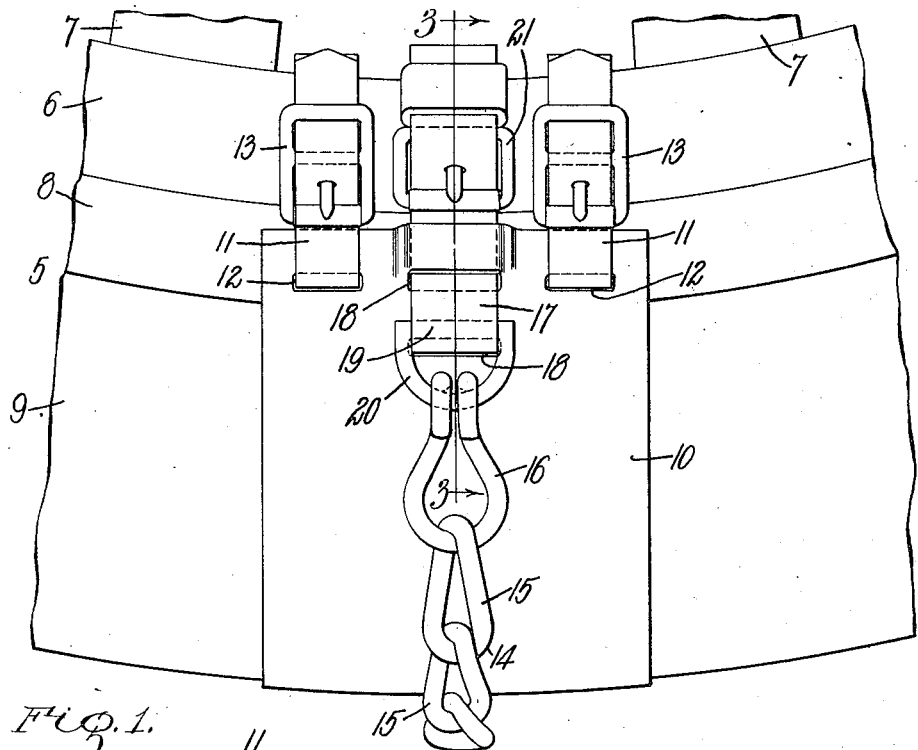
Fig. 1.
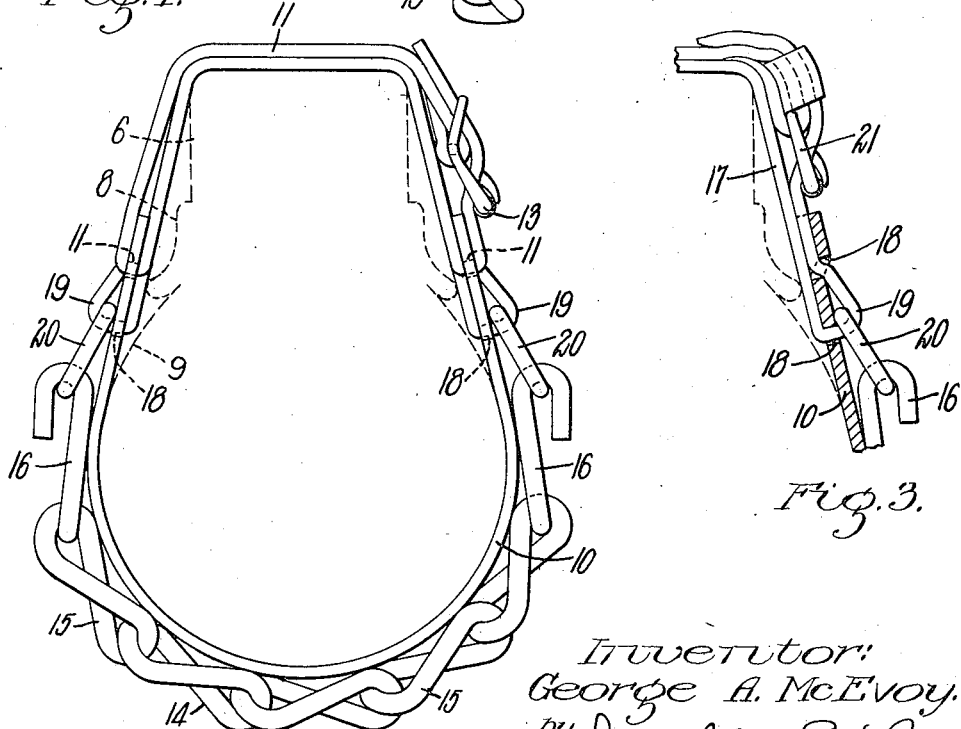
Fig. 2.
Fig. 3.
Inventor:
George A. McEvoy.
by Franklin E. Low
Att'y.

Patented Mar. 24, 1936

2,034,821

UNITED STATES PATENT OFFICE 2,034,821

NONSKID DEVICE FOR WHEELS

George A. McEvoy, Newton, Mass.

Application April 23, 1934, Serial No. 721,915

3 Claims. (Cl. 152—14)

This invention relates to a non-skid device for wheels, particularly automobile wheels having rubber tires mounted thereon.

Certain types of non-skid devices in common use are open to criticism in that if their position is not changed occasionally and they remain for any length of time at the same location upon a wheel they may cause serious injury to the tire due to the fact that the amount that they may creep upon the wheel is restricted by the spokes of the wheel, and the wear to the tire always falls at approximately the same place thereon.

The object of this invention is to provide a device of practical construction which will effectively prevent a wheel from skidding and at the same time prevent the tire from wearing as hereinbefore mentioned, said device having a chain embodied therein which constitutes a primary road gripping element, together with a guard which is interposed between the chain and the tire and protects the latter from injury and wear and which constitutes a secondary road gripping element in that it assists the chain in preventing the wheel from slipping or skidding.

Another object of the invention is to provide a device of the character mentioned having a chain and guard embodied therein and so associated one with the other that the chain may be easily and quickly removed from the guard and wheel at any time without interfering with the guard or removing the latter from the wheel, said chain being constructed in such a manner that it may be removed from the means by which it is attached to the wheel without requiring the use of tools of any character, the attaching means for the chain being interlaced with the guard in such a manner that it is firmly secured to the guard and wheel while the chain remains detached therefrom.

Another object of the invention is to provide a device including a chain and guard, each of which has separate attaching means provided therefor, but which are so associated one with another that the attaching means for the chain also functions to assist in securing the guard to the wheel.

Still another object of the invention is to so associate the chain and guard one with another that the chain may be adjusted without interfering with the guard, and that the strain and pull on the chain caused by contact with the road will be borne entirely by the fastening means for the chain.

The invention consists in a non-skid device for wheels as set forth in the following specification and particularly as pointed out in the claims thereof.

Referring to the drawing:—

Fig. 1 represents a side elevation of a portion of a wheel and tire therefor, a non-skid device embodying my invention being illustrated attached thereto.

Fig. 2 is an end elevation of the device in position on a wheel, the latter being illustrated in dotted lines.

Fig. 3 is a detail sectional elevation taken on the line 3—3 of Fig. 1 looking in the direction of the arrows on said line.

Like numerals refer to like parts throughout the several views of the drawing.

In the drawing, 5 represents a portion of an automobile wheel of well-known construction embodying therein a felloe 6, spokes 7, rim 8 and tire 9. One or more of the devices of this invention may be attached to the wheel 5 as may be desired, preferably being applied thereto between two of the spokes 7 thereof. Each device embodies therein a guard 10 constructed of a strong tough sheet material as, for example, leather, or rubber suitably reinforced, which is secured to the wheel 5 by means of a pair of straps 11 which are interlaced through slots 12 provided in the upper edge portions of said guard, and said straps extend from said upper edge portions over the felloe 6 of the wheel. The straps 11 are provided with suitable buckles 13 and it is evident that any of the well-known types of buckles or clasps may be used.

Located midway between the front and rear edges of the guard 10 and contacting with the tread surface and side portions thereof is a chain 14 embodying therein a plurality of links 15 of a type well known in the art and adapted to provide an effective gripping action upon a roadway. The chain 14 terminates at each end thereof in a link 16 which is formed to also constitute a hook. The chain 14 is secured to the guard 10 and to the wheel 5 by means of a strap 17 which is interlaced through parallel slots 18 provided in the upper edge portions of the guard 10, there being a pair of said slots 18 provided at each side of the guard adjacent to the edge thereof and between the slots 12. The strap 17 is interlaced through the slots 18 at each side of the guard 10 in a manner to form loops 19 at the outer side of the guard and a ring 20 is carried by each of said loops. The end links 16 of the chain 14 hook on to the rings 20 but are not clinched thereto as it is desired that said chain may be detached from the links 20 without it being necessary to utilize tools of any character. A buckle 21 is provided for the strap 17 and any of the well-known types of buckles or clasps may be used.

When the device of this invention is attached to a wheel the straps 11 constitute the principal means by which the guard 10 is secured to said wheel but the strap 17 nevertheless assists in securing said guard to the wheel because it is interlaced through the slots 18 of the guard. The strap 17 not only secures the chain 14 in position, but also constitutes the means whereby the tension upon the chain is adjusted. The slots 18 for the strap 17 guide the latter, and as the loops 19 are formed by interlacing the strap 17 through these slots, the rings 20 cannot become detached from said loops and lost. Furthermore, the chain 14 cannot be accidentally detached from the rings 20, as it is necessary to first loosen the buckle 21 and slacken up on the strap 17 before the end links 16 can be unhooked from the rings. If while driving it is found that the chains are unnecessary, they can be very easily and quickly detached from the device by releasing the buckle 21 and loosening up sufficiently on one of the loops 19 to permit the ring 20 carried by said loop to be unhooked from the link 16. The link 16 at the other end of the chain may then be unhooked from its ring 20 without loosening the loop in which said ring is carried. The strap 17 is then tightened up and fastened by its buckle 21.

The chain 14, of course, constitutes the principal or primary road gripping element but the guard 10 nevertheless will also aid in preventing the tire 9 from slipping under certain conditions, as the front and rear edges of said guard will present an effective road gripping means particularly where there is a tendency for the rear wheels to spin around when starting the car on a slippery surface.

I claim:—

1. A non-skid device for a wheel comprising, in combination, a chain, a guard of sheet material adapted to be interposed between said chain and a tire for said wheel, said guard having a pair of parallel slots provided therein at each side thereof, straps attached to said guard to fasten the guard to the wheel, and a strap positioned between said first-named straps and interlaced through both pair of slots and slidably connected to the chain and fastening the latter to the wheel independent of the attaching means for the guard, whereby the chain is positioned by the guard and the tension upon said chain may be adjusted without affecting the tension of the guard.

2. A non-skid device for a wheel comprising, in combination, a chain, a guard of sheet material adapted to be interposed between said chain and a tire for said wheel, said guard having a pair of parallel slots provided therein at each side thereof, straps interlaced with said guard to fasten the guard to the wheel, a strap interlaced through both pair of slots and forming loops at the opposite outer sides of the guard between the respective slots of each of said pair of slots, and a ring slidable in each of said loops adapted to be attached to the ends of said chain whereby the latter is attached to the wheel independent of the attaching means for the guard and the tension upon the chain may be varied without affecting the tension upon the guard.

3. A non-skid device for a wheel comprising, in combination, a chain having a hook at each end thereof, a guard of sheet material adapted to be interposed between said chain and a tire for said wheel, said guard having a plurality of slots provided therein at each side thereof, straps interlaced through certain of said slots and fastening the guard to the wheel, another strap positioned between said first-named straps and interlaced through other of said slots and forming loops at the opposite outer sides of the guard between the slots through which it is interlaced, and a ring slidable in each of said loops adapted to be detachably connected to the hooks of said chain whereby the latter is attached to the wheel and may be detached therefrom without affecting the tension upon the guard.

GEORGE A. McEVOY.